US005890190A

United States Patent [19]

Rutman

[11] Patent Number: 5,890,190

[45] Date of Patent: Mar. 30, 1999

[54] FRAME BUFFER FOR STORING GRAPHICS AND VIDEO DATA

[75] Inventor: Sergei Rutman, Boulder Creek, Calif.

[73] Assignee: Intel Corporation, Santa Clara, Calif.

[21] Appl. No.: 486,075

[22] Filed: Jun. 7, 1995

Related U.S. Application Data

[63] Continuation of Ser. No. 286,391, Aug. 5, 1994, abandoned, which is a continuation of Ser. No. 997,717, Dec. 31, 1992, abandoned.

[51] Int. Cl.[6] .............................. G06F 12/00; G06F 3/153

[52] U.S. Cl. .......................... 711/101; 711/154; 345/135; 345/153; 345/162; 345/164

[58] Field of Search ..................................... 345/135, 153, 345/154, 164, 162, 327, 302; 395/428, 481; 711/101, 154

[56] References Cited

U.S. PATENT DOCUMENTS

| | | | |
|---|---|---|---|
| 4,868,765 | 9/1989 | Diefendorff | 364/521 |
| 4,907,086 | 3/1990 | Truong . | |
| 4,947,257 | 8/1990 | Fernandez et al. | 358/183 |
| 4,991,014 | 2/1991 | Takahashi et al. . | |
| 5,025,249 | 6/1991 | Seiler et al. | 340/721 |
| 5,097,257 | 3/1992 | Clough et al. | 340/814 |
| 5,216,413 | 6/1993 | Seiler et al. | 340/721 |
| 5,230,041 | 7/1993 | Dinwiddie, Jr. et al. | 395/162 |
| 5,245,322 | 9/1993 | Dinwiddie, Jr. et al. | 395/115 |
| 5,257,348 | 10/1993 | Roskowski et al. | 395/157 |
| 5,274,753 | 12/1993 | Roskowski et al. | 395/135 |
| 5,345,554 | 9/1994 | Lippincoff et al. | 395/162 |
| 5,347,624 | 9/1994 | Takanashi et al. | 395/157 |

FOREIGN PATENT DOCUMENTS

| | | |
|---|---|---|
| 0 384 257 A2 | 8/1990 | European Pat. Off. . |
| 0 484 970 A2 | 5/1992 | European Pat. Off. . |
| 2 073 997 A | 10/1981 | United Kingdom . |
| WO 93/21623 | 10/1993 | WIPO . |

OTHER PUBLICATIONS

IBM Technical Disclosure Bulletin, vol. 32, No. 4B, Sep. 1989 –Video System with Real–Time Multi–Image Capability and Transparency (pp. 192–193).

*Primary Examiner*—Eddie P. Chan
*Assistant Examiner*—Tuan V. Thai
*Attorney, Agent, or Firm*—William H. Murray

[57] ABSTRACT

A single frame buffer system is provided for displaying pixels of differing types according to standard pixel information types. Memory receives the pixel information wherein the pixel associated with each item of pixel information is further associated with a control signal for indicating the pixel type of the associated pixel. Devices for interpreting each type of pixel information to provide pixel display information are provided. Based upon the pixel type control signal, the associated pixel information is interpreted by the correct interpretation device to provide the pixel display information. The different pixel types may be graphics pixels and video pixels. In this case the output of either graphics processing circuitry or the output of video processing circuitry is selected for display according to the control signal. This single frame buffer system is effective to provide one-to-one mapping between the received pixel information and displayed pixels. The pixel type control signal may also include a signal representative of the number of consecutive pixels of one of the two pixel types.

16 Claims, 6 Drawing Sheets

FRAME BUFFER FOR STORING GRAPHICS AND VIDEO DATA

This is a continuation of applications Ser. No. 08/286,391 filed on Aug. 5, 1994, now abandoned, which is a continuation of Ser. No. 07/997,717, filed on Dec. 31, 1992, now abandoned.

FIELD OF THE INVENTION

This invention relates to the field of video processing and in particular to the use of frame buffers in the field of video processing.

BACKGROUND ART

Several formats have been presented for storing pixel data in video subsystems. One approach is providing twenty-four bits of red, green, blue (RGB) information per pixel. This approach yields the maximum color space required for video at the cost of three bytes per pixel. Depending on the number of pixels in the video subsystem, the copy/scale operation could be over-burdened by this.

A second approach is a compromise with the twenty-four bit system. This approach is based on sixteen bits of RGB information per pixel. Systems of this nature require fewer bytes for the copy/scale operation but have the disadvantage of less color depth. Additionally, since the intensity and color information are encoded in the R, G and B components of the pixel, this approach does not take advantage sensitivity of the human eye to intensity and its insensitivity to color saturation. Other sixteen bit systems have also been proposed in which the pixels are encoded in a YUV format such as 6, 5, 5 and 8, 4, 4. Although these systems are somewhat better than the sixteen bit RGB approach, the sixteen bit YUV format does not performance as well as twenty bit systems.

Eight bit color lookup tables provide a third approach to this problem. The color lookup table method uses eight bits per pixel as an index into a color map that typically has twenty bits of color space. This approach has the advantages of low byte count while providing twenty bit color space. However, there are only two hundred fifty-six colors available on the screen in this approach and image quality may be somewhat poor.

Dithering techniques that use adjacent pixels to provide additional colors have been demonstrated to have excellent image quality even for still images. However, these dithering techniques often require complicated algorithms and specialized palette entries in a digital-to-analog converter as well as almost exclusive use of a color lookup table. The overhead of running the dithering algorithm must be added to the copy/scale operation.

Motion video in some prior art systems is displayed in a 4:1:1 format referred to as the nine bit format. The 4:1:1 notation indicates that there are four Y samples horizontally for each UV sample and four Y samples vertically for each UV sample. If each sample is eight bits then a four by four block of pixels uses eighteen bytes of information or nine bits per pixel. Although image quality is good for motion video the nine bit format may be unacceptable for the display of high quality stills. In addition, the nine bit format does not integrate well with graphics subsystems. Other variations of the YUV subsampled approach include an eight bit format.

Systems integrating a graphics subsystem display buffer with a video subsystem display buffer generally fall into two categories. The two types of approaches are known as: (1) single active frame buffer architecture and (2) dual frame buffer architecture. The single active frame buffer architecture is the most straight forward approach and consists of a single graphics controller, a single digital-to-analog converter and a single frame buffer. In its simplest form, the single active frame buffer architecture represents each pixel on the display using bits in a display buffer which are consistent in their format regardless of the meaning of pixel on the display.

Thus, graphics pixels and video pixels are indistinguishable in the memory of the frame buffer. However, the single active frame buffer architecture graphics/video system, or the single active frame buffer architecture visual system, does not address the requirements of the video subsystem very well. Full screen motion video on the single active frame buffer architecture visual system requires updating every pixel in the display buffer thirty times a second.

In a typical system the display may be on the order of 1280 bits by one kilobyte by eight bits, Even without the burden of writing over thirty megabytes per second to the display buffer, eight bit video by itself does not provide the require video quality. Thus the single active frame buffer architecture system may either expand to sixteen bits per pixel or implement the eight bit YUV subsampled technique. Since sixteen bits per pixel yields over sixty megabytes per second into the frame buffer, it is an unacceptable alternative. A further disadvantage of this single frame buffer architecture is the need for redundant frame memory. This is caused by the need to store both a graphics pixel and a video pixel for at least a portion of the display.

The second category of architecture which integrates video and graphics is the dual frame buffer architecture. The dual frame buffer architecture visual system involves mixing two otherwise free-standing single frame buffer systems at the analog back end with a high-speed analog switch. Since the video and graphics subsystems are both single frame buffer designs each one can make the necessary tradeoffs in spatial resolution and pixel depth almost independently of the other subsystem. Dual frame buffer architecture visual systems also include the feature of being loosely-coupled. Since the only connection of the two subsystems is in the final output stage, the two subsystems may be on different buses within the system. The fact that the dual frame buffer architecture video subsystem is loosely-coupled to the graphics subsystem is usually the major reason such systems, which have significant disadvantages, are typically employed.

Dual frame buffer architecture designs typically operate in a mode that has the video subsystem genlocked to the graphics subsystem. Genlocking requires that both subsystems start to display their first pixel at the same time. If both subsystems run at the same horizontal line frequency with the same number of lines, then mixing of the two separate pixel streams may be performed with predictable results.

Since both pixel streams run at the same time, the process may be thought of as having video pixels underlaying the graphics pixels. If a determination is made not to show a graphics pixel, then the video information underlaying it shows through. In dual frame buffer architecture designs, it is not necessary for the two subsystems to have the same number of horizontal pixels. As an example, some known systems may have three hundred fifty-two video pixels underneath one thousand twenty-four graphics pixels.

The decision whether to show the video information or graphics information at each pixel position in dual frame buffer architecture visual systems is typically made on a pixel by pixel basis in the graphics subsystem. A technique often used is chroma keying. Chroma keying involves detecting a predetermined color in the graphics digital pixel stream or a predetermined color entry in a color lookup table and selecting either graphics or video accordingly. Another approach detects black in the graphics analog pixel stream because black is the easiest graphics level to detect. This approach is referred to as black detect. In either case, keying information is used to control the high speed analog switch and the task of integrating video and graphics on the display is reduced to painting the keying color in the graphics display wherever video pixels are to be displayed.

There are several disadvantages to dual frame buffer architecture visual systems. The goal of high integration is often complicated by the requirement that there be two separate, free standing subsystems. The cost of having duplicate digital-to-analog converters, display buffers, and cathode ray tube controllers may be significant. The difficulty of genlocking the pixel streams and the cost of the high-speed analog switch are two more disadvantages. In addition, placing the analog switch in the graphics path has detrimental effects on the quality of the graphics display. This becomes a greater problem as the spatial resolution and/or line rate of the graphics subsystem increases. A further disadvantage of the dual frame buffer architecture is the same as that found in the single active frame buffer architecture, the need for redundant frame memory. This is caused by the need to store both a graphics pixel and a video pixel for at least a fraction of the display. For both the single active frame buffer and the dual frame buffer the two pixels are sent to either-a digital multiplexor or an analog multiplexor and a decision is made on which is displayed.

Digital-to-analog converters within these visual frame buffer architectures are important high performance components. The digital-to-analog converters of these architectures may accept YUV color information and the RGB color information simultaneously to provide chroma keying according to the received color information. In prior art chroma keying systems a decision is made for each pixel of a visual display whether to display a pixel representative of the YUV color value or a pixel representative of the RGB color value. The RGB value within a chroma keying system is typically provided by the graphic subsystem. The YUV value within a chroma keying system is typically provided by a video subsystem. Because the digital-to-analog converters required to select between pixels are such high performance devices the use of two of them rather than one adds a significant cost to a system.

In many of these conventional chroma keying systems the determination regarding which pixel is displayed is based upon the RGB color value and in a single display image there may be a mixture of pixels including both YUV pixels and RGB pixels. Thus it will be understood that each pixel displayed using conventional chroma keying systems is either entirely a video pixel or entirely a graphics pixel. Chroma keying merely determines which to select and provides for the display of one or the other.

"Visual Frame Buffer Architecture", U.S. patent application Ser. No. 870,564, filed by Lippincott, and incorporated by reference herein, teaches a color lookup table method which addresses many of the problems of prior art systems. In the Lippincott method an apparatus for processing visual data is provided with storage for storing a bit plane of visual data in a one format which may, for example, be RGB. A graphics controller is coupled to the storage by a data bus, and a graphics controller and the storage are coupled through a storage bus. Further storage is provided for a second bit plane of visual data in another format different from the first format. The second format may, for example, be YUV. The further storage is coupled to the graphics controller by a data bus. The second storage is also coupled to the graphics controller through the storage bus.

The method taught by Lippincott merges a pixel stream of visual data stored on the first storage and visual data stored on the further storage using only a single digital-to-analog converter. The merged pixel stream is then displayed. A disadvantage of this type of frame buffer architecture is the need for redundant frame memory. This is caused by the need to store both a graphics pixel and a video pixel for at least a fraction of the display.

SUMMARY OF THE INVENTION

A single frame buffer system is provided for displaying pixels of differing types according to standard pixel information types. Memory receives the pixel information wherein the pixel associated with each item of pixel information is further associated with a control signal for indicating the pixel type of the associated pixel. Devices for interpreting each type of pixel information to provide pixel display information are provided. Based upon the pixel type control signal, the associated pixel information is interpreted by the correct interpretation device to provide the pixel display information.

DETAILED DESCRIPTION OF THE INVENTION

Figure 1:
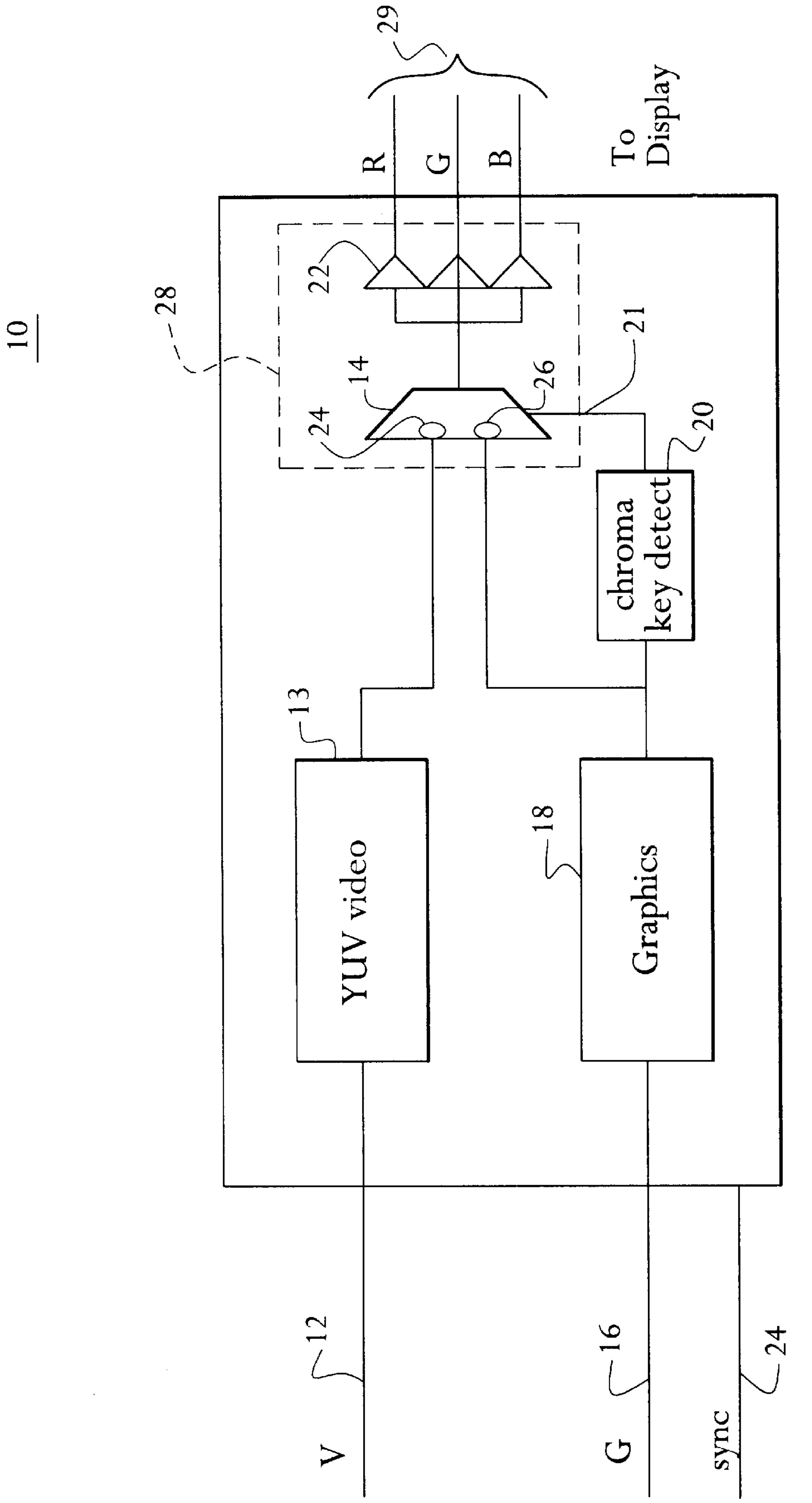
FIG. 1 Prior Art
FIG. 1 shows a block diagram representation of a prior art video/graphics display system requiring redundant storage of video and graphics pixels.

Referring now to FIG. 1, there is shown prior art video/graphics display system 10. Video input signals are received by prior art video/graphics display system 10 by way of video input line 12 and transmitted through YUV video path 13 to video multiplexer input 24 of color value multiplexer 14. Graphics input signals are received by video/graphics display system 10 by way of graphics input line 16 and transmitted by way of graphics path 18 to graphics multiplexer input 26 of color value multiplexer 14. Color value multiplexer 14 and digital-to-analog converter 22 of pixel processing block 28 provide a conventional RGB output on display bus 29.

Color value multiplexer 14 of prior art video/graphics display system 10 is controlled by chroma-key detect circuit 20. Chroma-key detect circuit 20 determines, for each pixel display position, whether a video pixel or a graphics pixel is displayed and controls multiplexer 14 accordingly by way of multiplexer control line 21. This determination by chroma-key detect circuit 20 may be based upon the presence of a predetermined color, or pixel value, at the output of graphics path 18. It will be understood that when YUV format video pixels are selected they must to converted to RGB format in a manner well understood by those skilled in the art.

The selected pixel for each display position appears at the output of color value multiplexer 14 and is applied to digital-to-analog converter 22 in order to provide conventional analog RGB signals required for display on a conventional display system. Prior art video/graphics display system 10 is typical of prior art systems requiring redundant storage of both a video pixel, as transmitted by video path 13, and a graphics pixel, as transmitted by graphics path 18.

Figure 2:
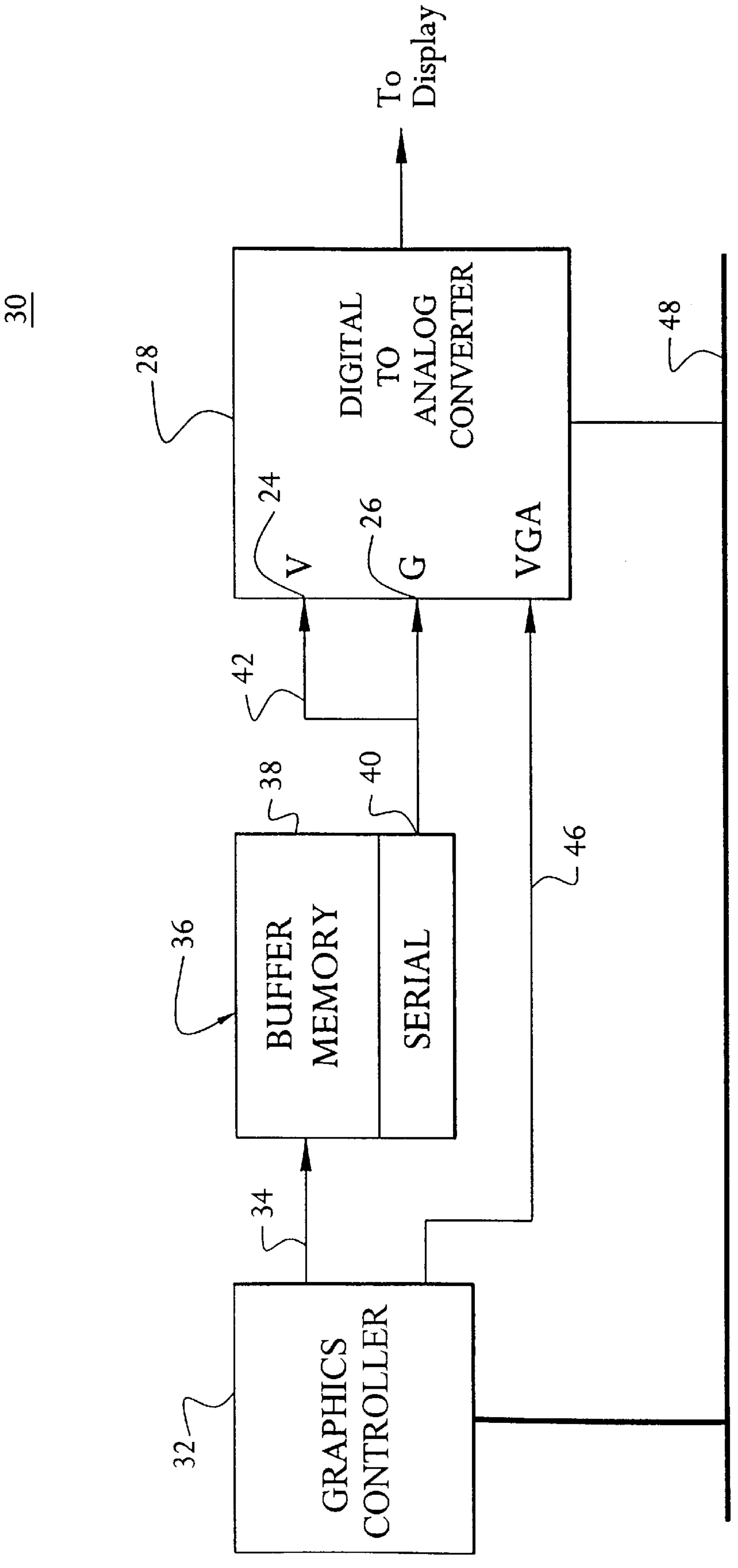
FIG. 2 shows a conceptual block diagram representation of an embodiment of the single frame buffer system of the present invention.

Referring now to FIG. 2, there is shown a conceptual block diagram representation of single frame buffer system 30 of the present invention. In single frame buffer system 30 all video and graphics data is stored by single frame buffer 36. Graphics controller 32 of single frame buffer system 30 receives video and graphics signals by way of system bus 48. Graphics controller 32 may be VGA compatible for communicating with block 28 by way of VGA line 46. Single frame buffer 36 receives video and graphic signals from graphics controller 32 by way of buffer input bus 34 and stores the video and graphics signals in buffer memory 38.

Data received in this manner by single frame buffer 36 may have video pixels and graphics pixels interspersed and arranged by graphics controller 32 according to the positions at which they are to be displayed. Thus only one item of pixel data is stored in buffer memory 38 of frame buffer 36 for each display position, the one which will actually be displayed. Single frame buffer 36 applies these buffered signals from serial output port 40 to digital-to-analog converter 28. The same output signal of serial output port 40 of single frame buffer 36 is simultaneously applied to both video multiplexer input 24 and graphics multiplexer input 26 of digital-to-analog converter 22. This data may be applied during the horizontal blank preceding a display line.

Figure 3:
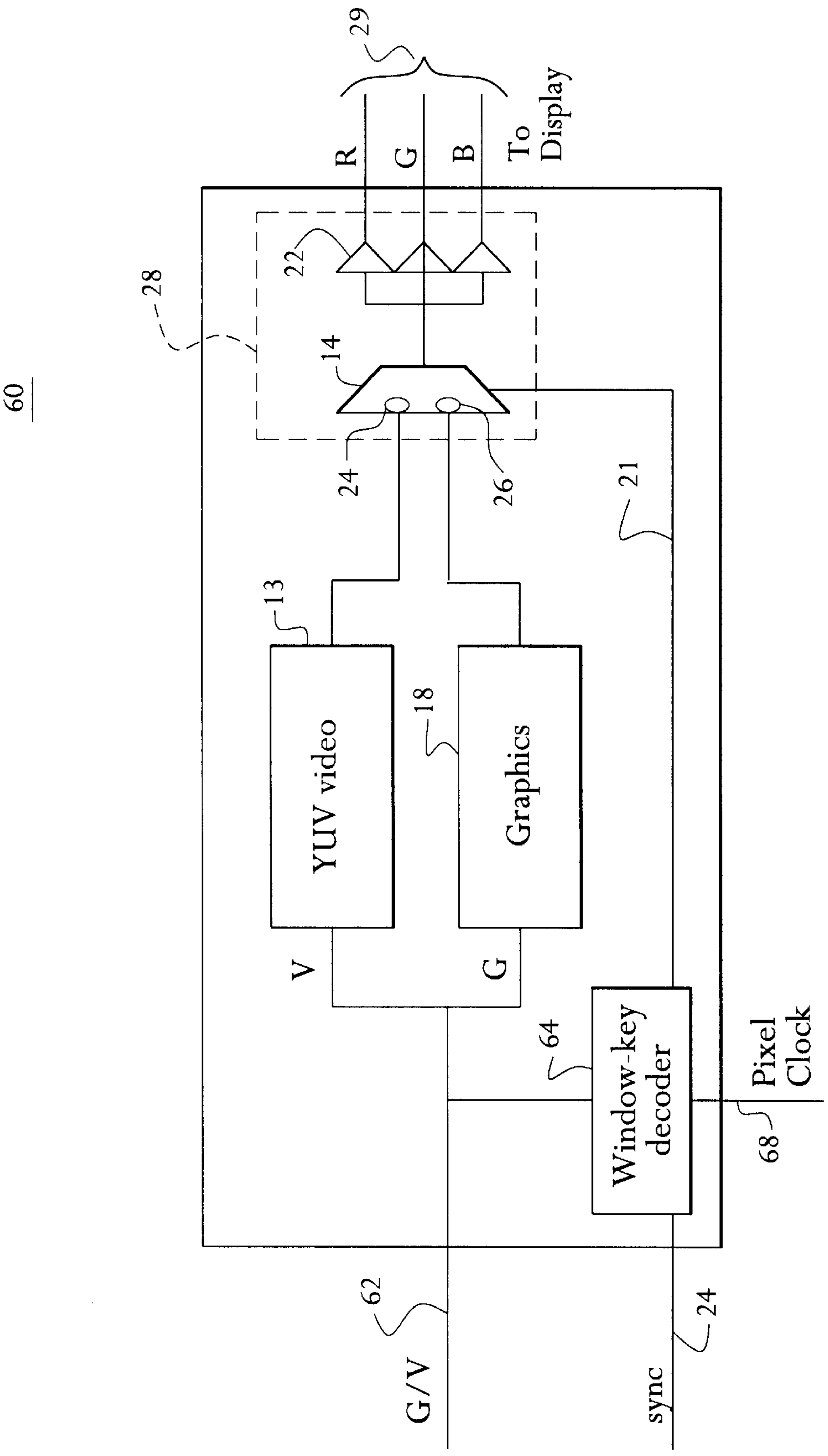
FIG. 3 shows a more detailed block diagram representation of an embodiment of the single frame buffer system of the present invention.

Thus buffer memory 38 of single frame buffer 36 is adapted to store the video signals and the graphic signals applied to single frame buffer 36 without any redundancy. Redundancy in the context of single frame buffer 36 in particular, and single frame buffer system 30 of the present invention in general, will be understood to mean redundant storage of data caused by storing more than one pixel value for a single displayed pixel position. For example, storage of both video pixel data and graphics pixel data for the same display pixel is considered to be redundancy with respect to the system of the present invention. Thus to avoid redundancy there is a one-to-one mapping between the memory locations storing the image and the pixel positions of the displayed image Referring now to FIG. 3, there is shown a block diagram representation of an embodiment of single frame buffer system 60 in accordance with the present invention. Single frame buffer system 60 is thus a possible alternate embodiment of single frame buffer system 30 wherein window-key decoder 64, among other possible features, is added to prior art graphics and video system 10. Single frame buffer system 60 receives a combined graphics and video signal by way of graphics and video input line 62. An image represented by the signals on graphics and video input line 62 may, for example, include frames which are partially graphics and partially video. Because each item of pixel data of graphics and video input line 62 may represent either a graphics pixel or a video pixel the information representing each pixel must contain, among other things, an indication of whether the pixel is a graphics pixel or a video pixel.

The input signal of line 62 is applied to both the YUV video path 13 and the graphics path 18. It will be understood, therefore, that within buffer system 60 both graphics and video pixels are transmitted by way of YUV video path 13 and that both graphics and video pixels are transmitted by way of graphics path 18. The output of pixel transmission paths 13, 18 is applied to multiplexer inputs 24, 26 of color value multiplexer 14 in the same manner as previously described with respect to the signals applied to color value multiplexer 14 of prior art graphics and video display system 10.

In single frame buffer system 60, color value multiplexer 14 is controlled by window-key decoder 64 rather than by a chroma keying system. Window-key decoder 64 receives the same graphics and video signal received by pixel transmission paths 13, 18 by way of graphics and video input line 62. In accordance with this signal, as well as the signals of synchronization bus 24 and the pixel clock signal of clock line 68, window-key decoder 64 controls color value multiplexer 14 by way of multiplexer control line 21.

Color value multiplexer 14 is able to interpret both graphics data and video data and window-key decoder 6, indicates to multiplexer 14 which interpretation to actually use. Thus when graphics pixels are applied to single frame buffer system 60 by way of input line 62 and the same graphics pixels are applied to multiplexer 14 by both video path 13 and graphics path 18, window-key decoder 64 indicates to color value multiplexer 14 that the signals received are interpreted as graphics pixels. Similarly, when video pixels are received by input line 62, and transmitted simultaneously by paths 13, 18 to color multiplexer 14, window-key decoder 64 indicates to multiplexer 14 that the pixels received are interpreted as video pixels.

Figure 4:
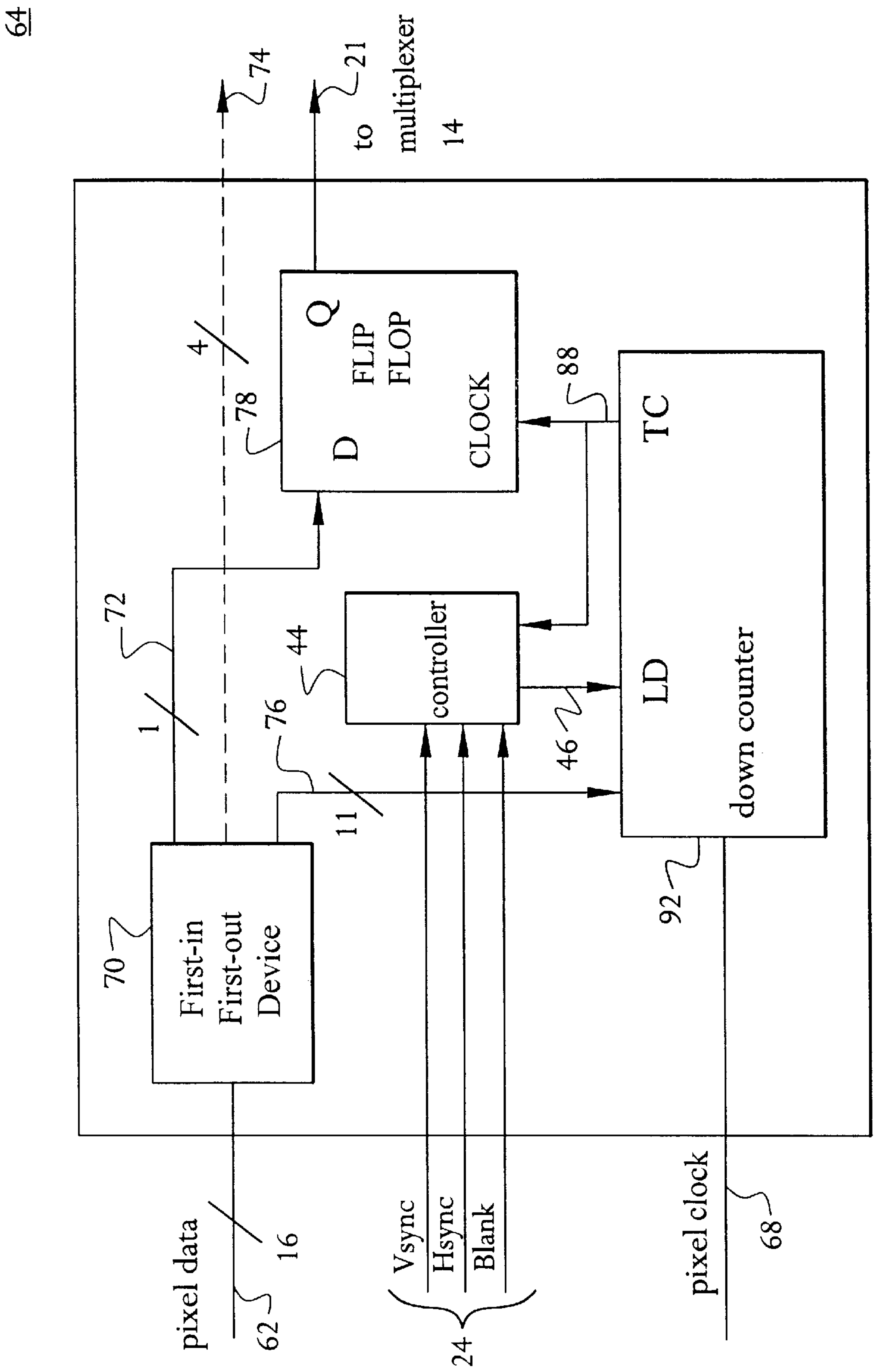
FIG. 4 shows a block diagram representation of the window-key decoder of the single frame buffer of FIG. 3.

Referring now to FIG. 4, there is shown a more detailed block diagram representation of window-key decoder 64 of single frame buffer system 60. Pixel data may be received by window-key decoder 64 from graphics controller 32 as previously described or from a conventional VRAM. Prior to being received by window-key decoder 64 the graphics and video data may reside in conventional VRAM in an intermixed format or it may be received by graphics controller 32 from system bus 48 and intermixed according to programmed operations. Various methods of intermixing the graphics and video data prior to applying it to window-key decoder 64 are known to those skilled in the art. Note that this combination of color spaces prior to transmission by way of graphics and video input line 62 may be done for any number of color spaces rather than just two.

This intermixed data which is applied to window-key decoder 64 by way of graphics and video input line 62 is first applied to first-in first-out device 70 within decoder 64 in sixteen bit words. Window-key decoder 64 receives vertical and horizontal synchronization signals, as well as a blanking signal, by way of control lines 24. A pixel clock signal is received by way of clock input line 68 and applied to parallel loadable down counter 92. It will be understood that the operations of window-key decoder 64 may be performed by a programmed micro-processor, the operating system of a video processing system or by a device driver as determined by one skilled in the art.

Figure 5:
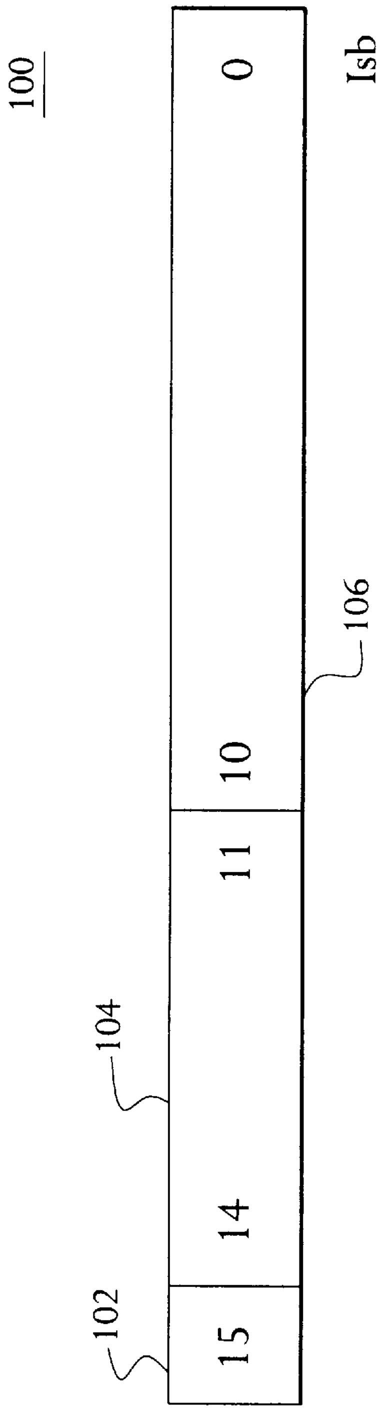
FIG. 5 shows the graphics/video pixel window of the single frame buffer system of FIG. 3.

Referring now also to FIG. 5 as well as FIG. 4, there is shown graphics/video pixel window 100. Graphics and video pixel window 100 is a schematic representation of sixteen bits of encoding information applied to YUV video path 13, graphics path 18, and first-in first-out 70 of window-key decoder 64 by way of graphics and video input line 62. It will be understood that each graphics/pixel window 100 is associated with the display information of one pixel. The information within graphics and video pixel window 100 includes pixel window fields 102, 104 and 106. Pixel window field 104 is reserved and may be used to communicate information as convenient from graphics controller 32 by way of window-key decoder 64 and decoder output line 74.

The data type bit of data type pixel window field 102 of graphics and video pixel window 100 indicates whether the pixel associated with pixel window 100 is graphics information or video information. Datatype field 102 of graphics and video pixel window 100 thus indicates whether the pixel information associated with graphics and video pixel window 100 is graphics information or video information. It is applied to flip flop 78 by way of datatype line 72 in order to clock data type bit 15 from the input of flip flop 78 to multiplexer control line 66, thereby indicating to color value multiplexer 14 whether the pixel information should be interpreted as video pixel information or graphics pixel information.

Graphics and video pixel window 100 within single frame buffer system 60 may also be provided with run length data field 106 for indicating the number of consecutive pixels which are one data type or the other. Run length data field 106 is loaded into parallel counter 92 by way of run length bus 76 under the control of controller 44 which loads the contents of run length field 106 into down counter 92 in accordance with the signals of synchronization bus 24. When the value of run length field 106 is counted down by down counter 92 a new value from datatype field 104 is clocked onto multiplexer control line 21 by counter 92.

Figure 6:
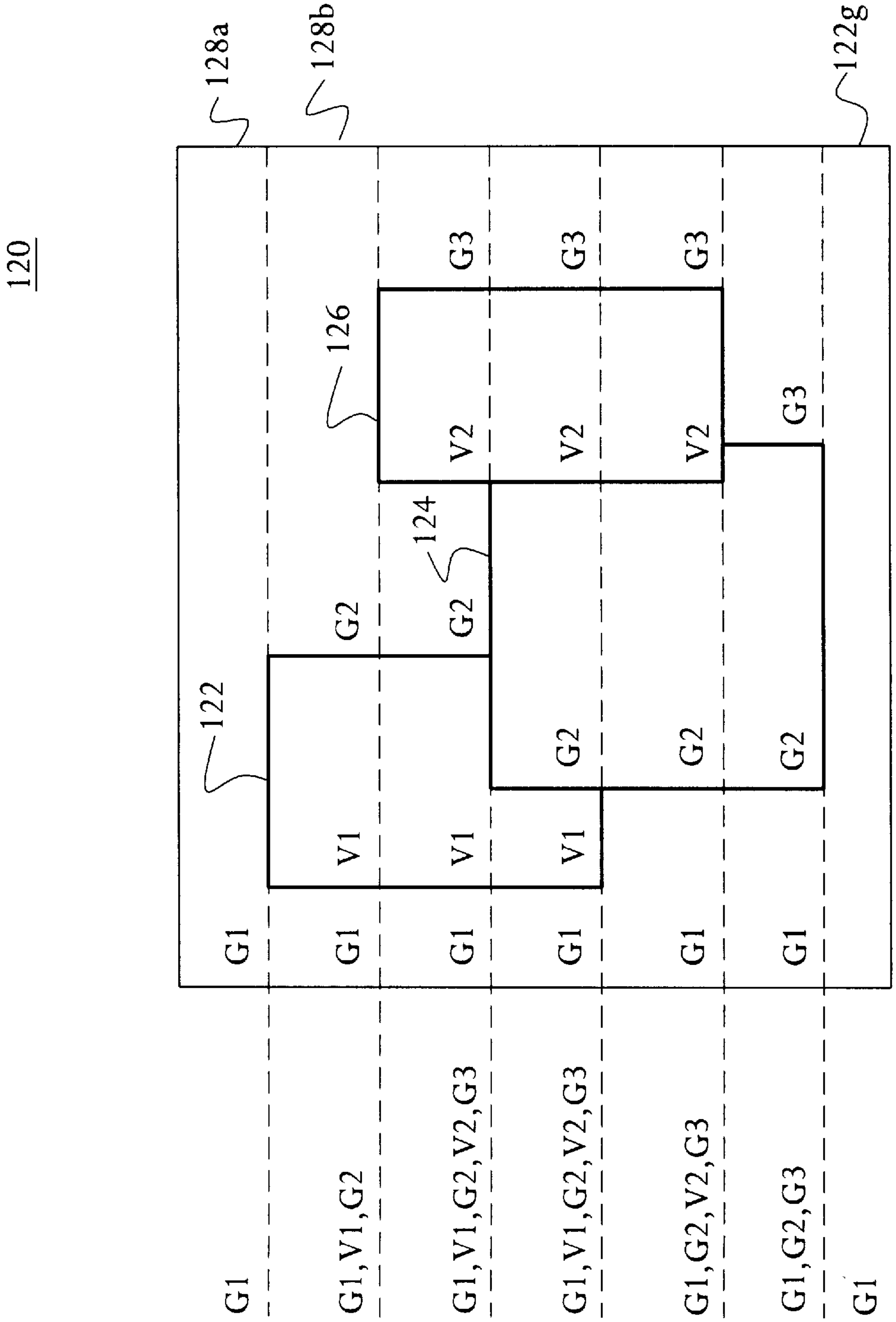
FIG. 6 shows an example of a combined graphics and video display according to the single frame buffer of FIG. 3.

Referring now to FIG. 6, there is shown buffered visual display 120. Buffered visual display 120 includes three overlapping regions 122, 124, 126 disposed upon a graphics background. Graphics region 124 is overlayed upon video region 122 and video region 126 is overlayed upon graphics region 124. Regions 122, 124, 126 divide buffered visual display 120 into seven horizontal sectors 128*a–g* as shown.

Horizontal sector 128*a* of visual display 120 includes only graphics and is therefore designated G1 for its entire horizontal distance. Horizontal sector 128*b*, from left to right, includes a graphics region, a video region and a further graphics region. Thus sector 128*b* may be designated G1, V1, G2 to indicate the two graphics regions separated by a video region. It will be understood that each of these regions has a run length as previously described with respect to run length field 106 of graphics and video window 100 and parallel loadable down counter 92.

Horizontal sector 128*c* from left to right, includes a graphics region, a video region, a second graphics regions, a second video region, and a third graphics region. Thus horizontal sector 128*c* may be designated G1, V1, G2, V2, G3. This process is continued for all horizontal sectors 128*a–h* of buffered visual display 120.

For each of horizontal sector 128a-h several bytes of memory are used to encode the above-indicated sequence of graphics and video pixels. This information is loaded into block 28 of single frame buffer system 60 of the present invention during the horizontal blank preceding the corresponding line. It may be encoded using the method of graphic and video pixel window 100 or any other method understood by those skilled in the art.

It will be understood that various changes in the details, materials and arrangements of the features which have been described and illustrated in order to explain the nature of this invention, may be made by those skilled in the art without departing from the principle and scope of the invention as expressed in the following claims.

I claim:

1. A single frame buffer architecture system in a system for processing for display digital graphics signals and digital video signals, the single frame buffer architecture system comprising:

(a) a graphics controller for receiving combined digital video signals and digital graphics signals over a single bus, the digital video signals comprising a plurality of video pixels and the digital graphics signals comprising a plurality of graphics pixels, wherein each digital video pixels and each digital graphics pixel includes a data type bit indicating the digital video pixel or digital graphics pixel as comprising one of a video pixel or graphics pixel;

(b) a VRAM for receiving said combined digital video signals and digital graphics signals from said graphics controller and for storing said combined digital video signals and digital graphics signals; and (c) means for receiving the data type bits whereby the processing system is instructed by each data type bit to process the digital video or digital graphics pixel associated with said data type bit as a video pixel or a graphics pixel, respectively;

wherein said means for receiving comprises a decoding means, and further comprising a multiplexing means coupled to said decoding means, said multiplexing means receiving the digital video signals and digital graphics signals, said decoding means instructing said multiplexing means to process individual ones of the digital video signals or digital graphics signals as a video pixel or a graphic pixels, respectively.

2. The system of claim 1, further comprising means for converting the digital video signals and digital graphics signals to analog video signals and analog graphics signals, respectively, suitable for display.

3. The system of claim 2, wherein the digital video and digital graphics signals are stored according to the positions in which they will be displayed.

4. The system of claim 2, wherein the means for converting comprises the means for receiving the identifiers, whereby the means for converting selectively converts digital video signals to analog video signals and digital graphics signals to analog graphics signals.

5. The system of claim 1, further comprising a digital video signals path and a digital graphics signals path, wherein the combined video signals and digital graphics signals are coupled to each of the digital video signals path and the digital graphics signals path.

6. A method for processing for display digital graphics signals and digital video signals in a single frame buffer architecture system, comprising the steps of:

(a) receiving with a graphic controller combined digital video and digital graphics signals over a single bus, the digital video signals comprising a plurality of video pixels and the digital graphics signals comprising a plurality of graphics pixels, wherein each digital video pixel and each digital graphics pixel includes a data type bit indicating the digital video pixel or digital graphics pixel as comprising one of a video pixel or graphics pixel;

(b) receiving said combined digital video signals and digital graphics signals from said graphics controller and storing with a VRAM said combined digital video signals and digital graphics signals; and (c) receiving and interpreting the data type bits whereby the processing system is instructed by each data type bit to process the digital video or digital graphics pixel associated with said data type bit as a video pixel or a graphics pixel, respectively;

wherein said receiving step further comprising decoding and multiplexing the digital video signals and the digital graphics signals to process individual ones of the digital video signals or digital graphics signal as a video pixel or a graphics pixel, respectively.

7. The process of claim 6, further comprising the steps of converting the digital video signals and digital graphics signals to analog video signals and analog graphics signals, respectively, and displaying the analog video signals and analog graphics signals.

8. The process claim 7, wherein the step of storing comprises storing the digital video signals and digital graphics signals according to the positions in which they will be displayed.

9. The process of claim 7, wherein the step of converting selectively converts digital video signals to analog video signals and digital graphics signals to analog graphics signals.

10. The process of claim 6, further comprising the step of transmitting the combined digital video signals and digital graphics signals along a separate digital video signals path and a separate digital graphics signals path.

11. The process of claim 6, wherein step (b) includes the step of multiplexing the digital video signals and digital graphics signals whereby individual one of the digital video signals and digital graphics signals are multiplexed for processing as a video pixel or a graphics pixel, respectively, as instructed by the data type bits.

12. A single frame buffer architecture in a system for processing for display digital graphics and digital video signals, comprising:

a graphic controller for receiving combined digital video signals and digital graphics signals over a single bus, the digital video signals comprising a plurality of video pixels and the digital graphics signals comprising a plurality of graphics pixels, wherein each digital video pixel and each digital graphics pixel includes a data type bit indicating the digital video pixel or digital graphics pixel as comprising one of a video pixel or graphic pixel;

a VRAM for receiving said combined digital video signals and digital graphics signals from said graphics controller and for storing said combined digital video signals and digital graphics signals; and a multiplexer for receiving the data type bits whereby the multiplexer is instructed by each data type bit to process the digital video or digital graphics pixel associated with said data type bit as a video pixel or a graphics pixels, respectively;

a decoder further coupled to said multiplexer for first decoding the data type bits, whereby the multiplexer is instructed by the decoder to process individual ones of the digital video signals or digital graphics signals as video pixels or a graphics pixels, respectively.

13. The architecture of claim 12, further comprising a digital to analog converter for converting the digital video signals and digital graphics signals to analog video signals and analog graphics signals, respectively, suitable for display.

14. The architecture of claim 13, wherein the digital video signals and digital graphics signals are stored in the memory according to the positions in which they will be displayed.

15. The architecture of claim 13, wherein the digital to analog converter comprises the multiplexer, whereby the digital to analog converter is operable to selectively convert digital video signals to analog video signals and digital graphics signals to analog graphics signals.

16. The architecture of claim 12, further comprising a digital video signals path and a digital graphics signals path, wherein the combined digital video signals and digital graphics signals are coupled to each of the digital video signals path and the digital graphics signals path.

* * * * *